(12) United States Patent
Wu et al.

(10) Patent No.: US 12,469,553 B2
(45) Date of Patent: Nov. 11, 2025

(54) OPERATING METHOD, MEMORY SYSTEM, AND CONTROL CIRCUIT

(71) Applicant: Taiwan Semiconductor Manufacturing Company, Ltd., Hsinchu (TW)

(72) Inventors: Cheng-Hsien Wu, Hsinchu (TW); Pei-Jer Tzeng, Hsinchu County (TW); Xinyu Bao, Fremont, CA (US); Hengyuan Lee, Hsinchu County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 213 days.

(21) Appl. No.: 18/337,440

(22) Filed: Jun. 20, 2023

(65) Prior Publication Data

US 2024/0428854 A1 Dec. 26, 2024

(51) Int. Cl.
*G11C 13/00* (2006.01)
*G11C 11/16* (2006.01)

(52) U.S. Cl.
CPC ........ *G11C 13/003* (2013.01); *G11C 11/1659* (2013.01); *G11C 11/1673* (2013.01); *G11C 13/0004* (2013.01); *G11C 13/004* (2013.01); *G11C 13/0097* (2013.01); *G11C 2213/15* (2013.01); *G11C 2213/72* (2013.01)

(58) Field of Classification Search
CPC .............. G11C 13/003; G11C 11/1659; G11C 11/1673; G11C 13/0004; G11C 13/004; G11C 13/0097
See application file for complete search history.

(56) References Cited

U.S. PATENT DOCUMENTS

2009/0279344 A1* 11/2009 Toda ............... G11C 13/003
 365/230.06
2011/0273928 A1* 11/2011 Ong ............... G11C 11/1675
 365/171
2022/0270682 A1* 8/2022 Diaz ............... G11C 11/1675

* cited by examiner

*Primary Examiner* — Han Yang
(74) *Attorney, Agent, or Firm* — JCIPRNET

(57) ABSTRACT

Operating method, memory system, and control circuit are provided. The operating method is for operating a memory device comprising a selector and a memory element serially coupled to the selector. The operating method comprises presetting the memory device by providing a preset signal to the memory device, wherein the preset signal is clamped at a first current; and accessing the memory device by providing an access signal to the memory device, wherein a second current greater than the first current flows through the memory device when the access signal is provided to the memory device.

20 Claims, 12 Drawing Sheets presetting a memory device by providing a preset signal to the memory device, wherein the preset signal is clamped at a first current — S40 accessing the memory device by providing an access signal to the memory device, wherein a second current greater than the first current flows through the memory device when the access signal is provided to the memory device — S41

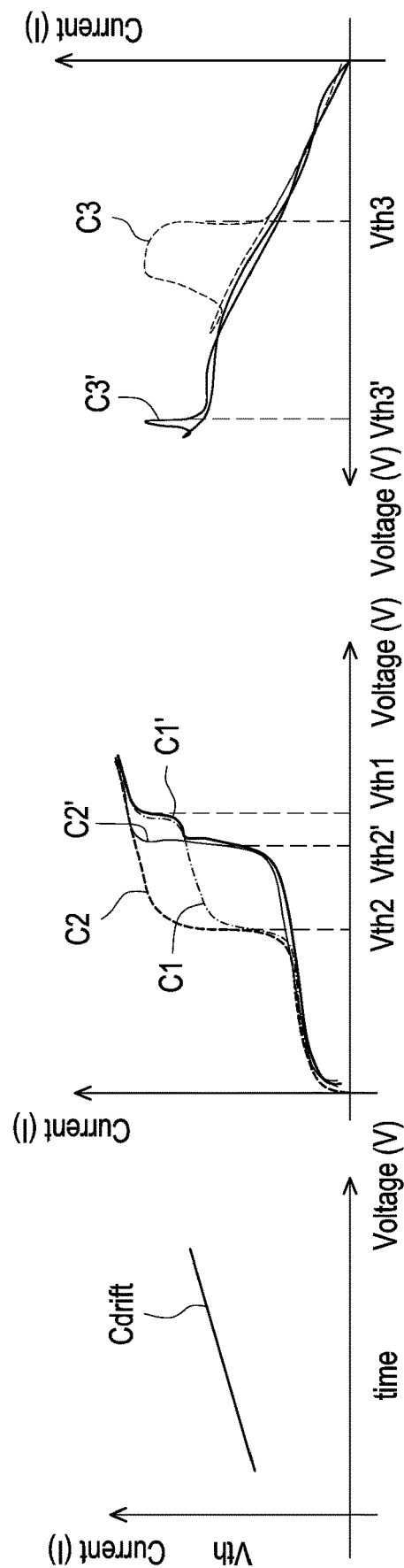

OPERATING METHOD, MEMORY SYSTEM, AND CONTROL CIRCUIT

BACKGROUND

With advances in digital technology, there is a greater demand for a nonvolatile memory device with higher capacity, less writing power, higher writing/reading speed, and longer service life. In order to meet the demand, refinement of a flash memory has been progressed. On the other hand, a nonvolatile memory device including memory cells each having a resistance variable element has been researched and developed.

Mostly, each of these nonvolatile memories has field effect transistors (FETs) that connect and disconnect the resistance variable elements from a driving circuit. The FETs have high on/off ratio and prevent leakage current from passing through the unselected memory cells. However, since a FET is a three-terminal device, controlling access of the resistance variable elements by the FETs can significantly limit design flexibility and integration level in creating these nonvolatile memories.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A illustrates a relationship curve of how a threshold voltage of the selector in FIG. 1A is drifted over time in accordance with some embodiments.

FIG. 3B illustrates relationship curves which are transformed from the relationship curves in FIG. 2C after affected by the drifted threshold voltage of the selector in accordance with some embodiments.

FIG. 3C illustrates a relationship curve which is transformed from the relationship curve in FIG. 2D after affected by the drifted threshold voltage of the selector, in accordance with some embodiments.

DESCRIPTION OF THE EMBODIMENTS

Figure 1B:
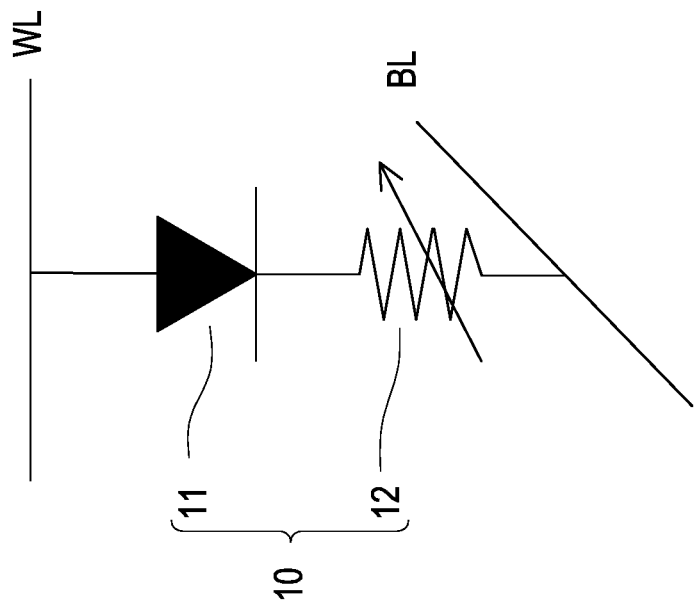
FIG. 1B illustrates a schematic diagram of an equivalent circuit of the memory device as illustrated in FIG. 1A according to some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1A:
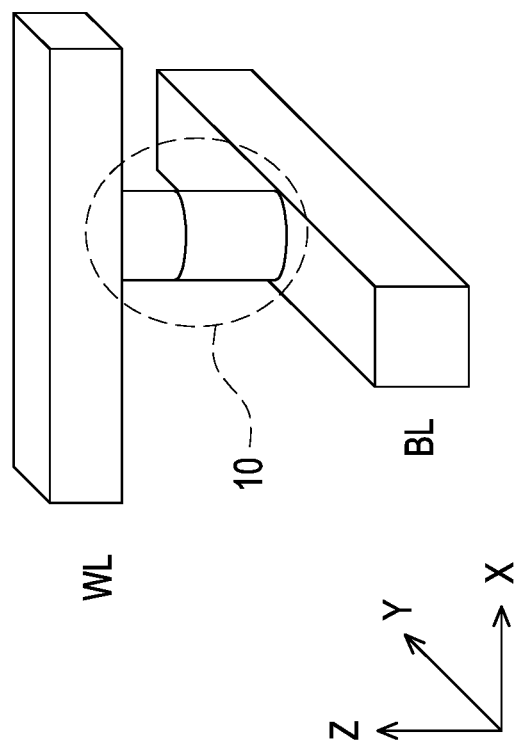
FIG. 1A illustrates a perspective view of a memory device according to some embodiments.

FIG. 1A illustrates a perspective view of a memory device 10 according to some embodiments. The memory device 10 has two terminals, respectively at a top side and a bottom side of the memory device 10, and coupled to a word line WL and a bit line BL. In some embodiments, the memory device 10 is also referred as a cross point memory device 10. The word line WL and the bit line BL are respectively coupled to the two terminals according the memory device 10. The memory device 10 may be accessed according to a voltage difference between the word line WL and the bit line BL. For example, a read operation or a write operation or an erase operation may be performed to the memory device 10 according to the voltage difference of the two terminals across the memory device 10.

In such embodiment, the memory device 10 is a three-dimensional structure extending along a z-direction, such that the two terminals of the memory device 10 are respective at a top side and a bottom side. The word line WL extending along a x-direction is coupled to the memory device 10 at a horizontal plane at the top side of the memory device 10. The bit line BL extending along a y-direction is coupled to the memory device 10 at a horizontal plane at the bottom side of the memory device 10.

FIG. 1B illustrates a schematic diagram of an equivalent circuit of the memory device 10 as illustrated in FIG. 1A according to some embodiments. The two terminals of the memory device 10 are respectively coupled to the word line WL and the bit line BL. The memory device 10 includes a selector 11 and a memory element 12 serially coupled to the selector 11. The selector 11 and the memory element 12 are serially coupled between the word line WL and the bit line BL with the selector 11 being coupled to the word line WL and the memory element 12 being coupled to the bit line BL.

In some embodiments, when a read operation or a write operation is performed or an erase operation to the memory device 10, the selector 11 may be functioned as a diode. The memory element 12 may be functioned as a, for example, but not limited to, variable resistance. An anode of the diode in the equivalent circuit may be connected to the word line WL, and a cathode of the diode in the equivalent circuit may be connected to the variable resistance. The variable resistance in the equivalent circuit is coupled between the cathode of the diode and the bit line BL and thus current flowing through the memory device 10 depends on a level of the variable resistance.

In some embodiments, the selector 11 may be turned on or conducted when the voltage difference between the word line WL and the bit line BL is greater than a predetermined threshold voltage. In some embodiments, the predetermined threshold voltage is a positive voltage. Therefore, the voltage difference applied between the word line WL and the bit line BL may be a positive voltage greater than the predetermined threshold voltage, and thus the applied voltage difference may control the selector 11 of the memory device 10 turned on or conducted.

When the selector 11 is turned on, the memory element 12 of the memory device 10 becomes accessible. The memory element 12 being accessible means that a read operation may be performed on the memory device 10 to readout data stored in the memory element 12, or a program operation or an erase operation may be performed on the memory device 10 to adjust a level of an electrical characteristic of the memory element 12 representing the data to be written in. Particularly, due to the conducted selector 11, the voltage difference between both ends of the memory device 10 may be applied to the memory element 12. Based on a level of the applied voltage difference, the data stored in the memory device may be read through evaluating a level of an electrical characteristic such as, but not limited to, a resistance or a conductance of the memory element 12. In other words, based on the level of the applied voltage difference, the level of the electrical characteristic of the memory element 12 of the memory device 10 may also be accordingly adjusted, causing the data stored in the memory device 10 may be accordingly programmed or erased.

In some embodiments, the memory element 12 may be a single-level cell (SLC), a multiple-level cell (MLC), a tri-level cell (TLC), a quadra-level cell (QLC) or the like. The memory element 12 may be, for example but not limited to, resistive random-access memory (ReRAM or RRAM), magnetic RAM (mRAM), phase change memory (PCM), flash memory comprising charge storage material or floating gate, or the like. Other types or configurations of memory elements are also within the scopes of various embodiments.

Figure 1C:
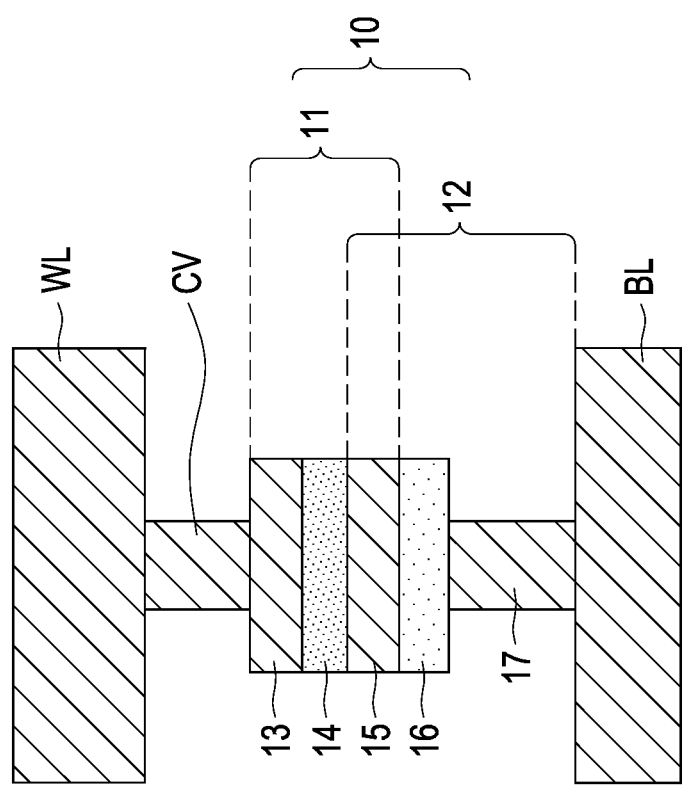
FIG. 1C illustrates a cross-sectional view of the memory device as illustrated in FIG. 1A according to some embodiments.

FIG. 1C illustrates a cross-sectional view of the memory device 10 as illustrated in FIG. 1A according to some embodiments. In this embodiment, the memory element 12 is a PCM memory. The memory element 12 may be an SLC, and the resistance of the memory element 12 may be programmed to store data. However, persons skilled in the art may modify or adjust the memory device based on different design concept, and thus other types of memories are also within the scopes of various embodiments.

Referring to FIGS. 1A and 1C, each memory cell 10 may include a selector 11 and a memory element 12. The selector 11 is a two-terminal switching device, and one of the terminals of the selector 11 is shared with the memory element 12. In some embodiments, an electrode 13 is functioned as a top terminal of the selector 11, and may be coupled to the word line WL through a conductive via CV. In addition, an electrode 15 may be functioned as a bottom terminal of the selector 11, and may be shared with the memory element 12. The electrodes 13, 15 are each formed of a conductive material. For example, candidates of the conductive material may include Cu, W, TiN, TaN, Ru, AlN, Co, C, Si, or the like and combinations thereof.

A switching layer 14 may be sandwiched between the electrodes 13, 15. An electrical resistance across the switching layer 14 may be altered during operation. When the switching layer 14 is in a low resistance state, the selector 11 is described as in a conducted state, and the memory element 12 becomes accessible. On the other hand, when the switching layer 14 is in a high resistance state, the selector 11 is described as in a cutoff state, and the memory element 12 is inaccessible. In some embodiments, the selector 11 is an ovonic threshold selector (OTS). In these embodiments, when a voltage bias applied across the switching layer 14 reaches a threshold voltage, a conductive path may be formed in the switching layer 14, and the switching layer 14 is in the low resistance state. On the other hand, when the voltage bias falls below the threshold voltage, the conductive path may be cut off, and the switching layer 14 is in the high resistance state. As an example, the switching layer 14 may include a chalcogenide compound. For instance, the switching layer 14 may include GeTe, GeCTe, AsGeSe, GeSbTe, GeSiAsTe, GeSe, GeSbSe, GeSiAsSe, GeS, GeSbS, GeSiAsS, the like, or combinations thereof.

The memory element 12 may be a two-terminal device as well. As described above, the electrode 15 may be functioned as a common terminal of the selector 11 and the memory element 12. In some embodiments, an electrode 17 is functioned as the other terminal of the memory element 12, and may be coupled to the bit line BL. As similar to the electrodes 13, 15, the electrode 17 is formed of a conductive material as well. As examples, candidates of the conductive material may include Cu, W, TiN, TaN, Ru, AlN, Co, C, Si, or the like and combinations thereof.

A storage layer 16 lies between the two terminals of the memory element 12 (e.g., the electrodes 15, 17). Microstructure in the storage layer 16 may be altered according to input signals applied across the storage layer 16. In corresponding to the microstructure change, the storage layer 16 may be switched between a high resistance state and a low resistance state. Further, the resistance state of the storage layer 16 may be held even when the input signal is removed, and the memory element 12 may be referred as a non-volatile memory device. In some embodiments, the memory element 12 is a phase change non-volatile memory device. In these embodiments, a crystallinity of the storage layer 16 may be increased when the storage layer 16 is turned to the low resistance state. On the other hand, when the storage layer 16 is in the high resistance state, the storage layer 16 may be amorphous or may have a rather low crystallinity. In some embodiments, the storage layer 16 is formed of a chalcogenide compound. The chalcogenide compound may include Ge, Te and Sb. For instance, the chalcogenide material may be GeSbTe, such as $Ge_2Sb_2Te_5$ (GST225), $Ge_4Sb_2Te_4$ (GST424) or so forth).

The signal for programming the storage layer 16 may be provided through the electrode 17. A thermal energy may be generated by the electrode 17 as a result of joule heating effect, and such thermal energy is provided to the storage layer 16 for changing the microstructure in the storage layer 16. In order to enhance the joule heating efficiency, the electrode 17 may be formed with a rather small diameter. In some embodiments, the electrode 17 has a footprint area smaller than a footprint area of each of the storage layer 16, the electrodes 15, 13 and the switching layer 14. In these embodiments, a sidewall of the electrode 17 may be laterally recessed from sidewalls of the storage layer 16, the electrodes 15, 13 and the switching layer 14.

Figure 2A:
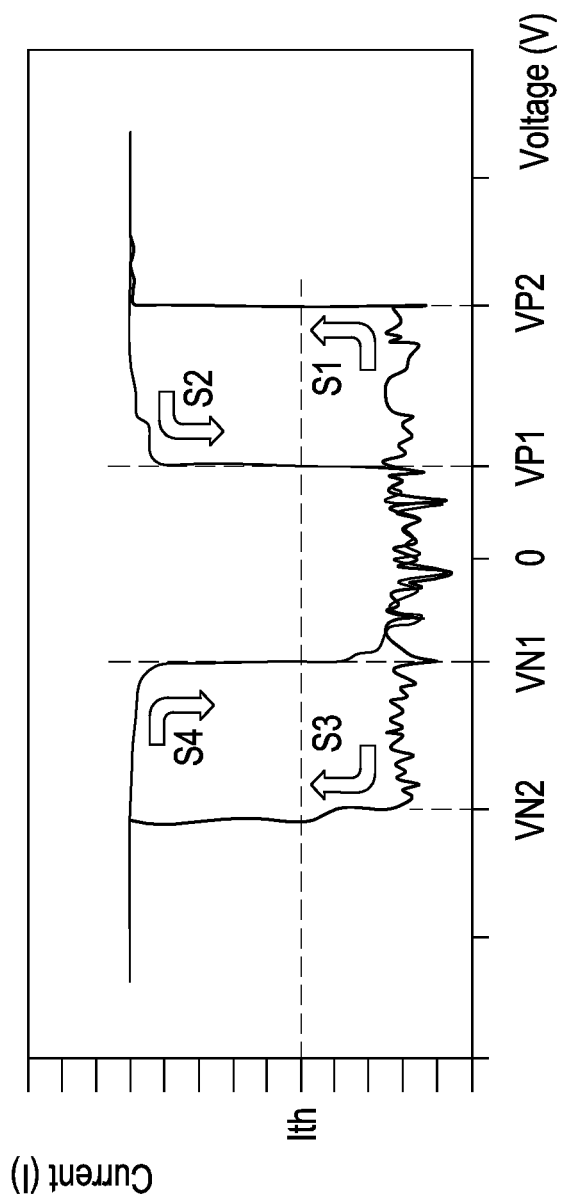
FIG. 2A illustrates relationship curves between voltage to current of the selector as illustrated in FIG. 1A according to some embodiments.

FIG. 2A illustrates relationship curves between voltage to current of the selector 11 as illustrated in FIG. 1A according to some embodiments. In some embodiments, the selector 11 may be a hysteresis selector.

It is noted that when the voltage difference between the word line WL and the bit line BL is a positive voltage, a voltage of the word line WL is greater than a voltage of the bit line BL. When the voltage difference between the word line WL and the bit line BL is positive, the selector 11 is operated at a forward biased voltage. On the contrary, when the voltage difference between the word line WL and the bit line BL is negative, a voltage of the word line WL is less than a voltage of the bit line BL. When the voltage difference between the word line WL and the bit line BL is negative, the selector 11 is operated at a reverse biased voltage.

In a first operating scenario when the voltage difference between the word line WL and the bit line BL is positive which makes the selector 11 to be forward biased, the selector 11 may have hysteresis characteristic. When the voltage difference is increasing, the current flowing through the selector 11 is changing along a direction S1. Specifically, when the voltage difference is increasing and changed from less than to be greater than a predetermined threshold voltage VP2, a state of the selector 11 is changed from cutoff (nonconductive) to be turned (conductive). Thus, the current flowing through the selector 11 is changed from less than to be greater than a predetermined current threshold Ith. On the other hand, when the voltage difference is decreasing, the current flowing through the selector 11 is changing along a direction S2. Specifically, when the voltage difference is changed from greater than to be less than a predetermined threshold voltage VP1, a state of the selector 11 is changed from turned on (conductive) to be cutoff (nonconductive), so the current flowing through the selector 11 is changed from greater than to be less than the predetermined current threshold Ith. In addition, the predetermined threshold voltage VP2 for turning on the selector 11 is greater than the threshold voltage VP1 for cutoff the selector 11, in order to realize the hysteresis characteristic of the selector 11.

In a second operating scenario when the voltage difference between the word line WL and the bit line BL is negative, which means the voltage on the bit line BL is greater than that on the word line WL, the selector 11 may also have hysteresis characteristic. Specifically, referring to left side of FIG. 2A, when the negative voltage difference is decreasing, the current flowing through the selector 11 is changing along a direction S3. Specifically, when the negative voltage difference is decreasing and changed from greater than to be less than a predetermined threshold voltage VN2, a state of the selector 11 is changed from cutoff (nonconductive) to be turned (conductive). Thus, the current flowing through the selector 11 is changed from less than to be greater than the predetermined current threshold Ith. On the other hand, when the negative voltage difference is increasing, the current flowing through the selector 11 is changing along a direction S4. Specifically, when the voltage difference is changed from less than to be greater than a predetermined threshold voltage VN1, a state of the selector 11 is changed from turned on (conductive) to be cutoff (nonconductive), so the current flowing through the selector 11 is changed from greater than to be less than the predetermined current threshold Ith. In addition, the predetermined threshold voltage VN2 for turning on the selector 11 is less than the threshold voltage VN1 for cutoff the selector 11, in order to realize the hysteresis characteristic of the selector 11. In at least one embodiment, it is possible to achieve one or more advantages including, but not limited to, larger memory window, less noise, or the like through the hysteresis characteristic.

Figure 2B:
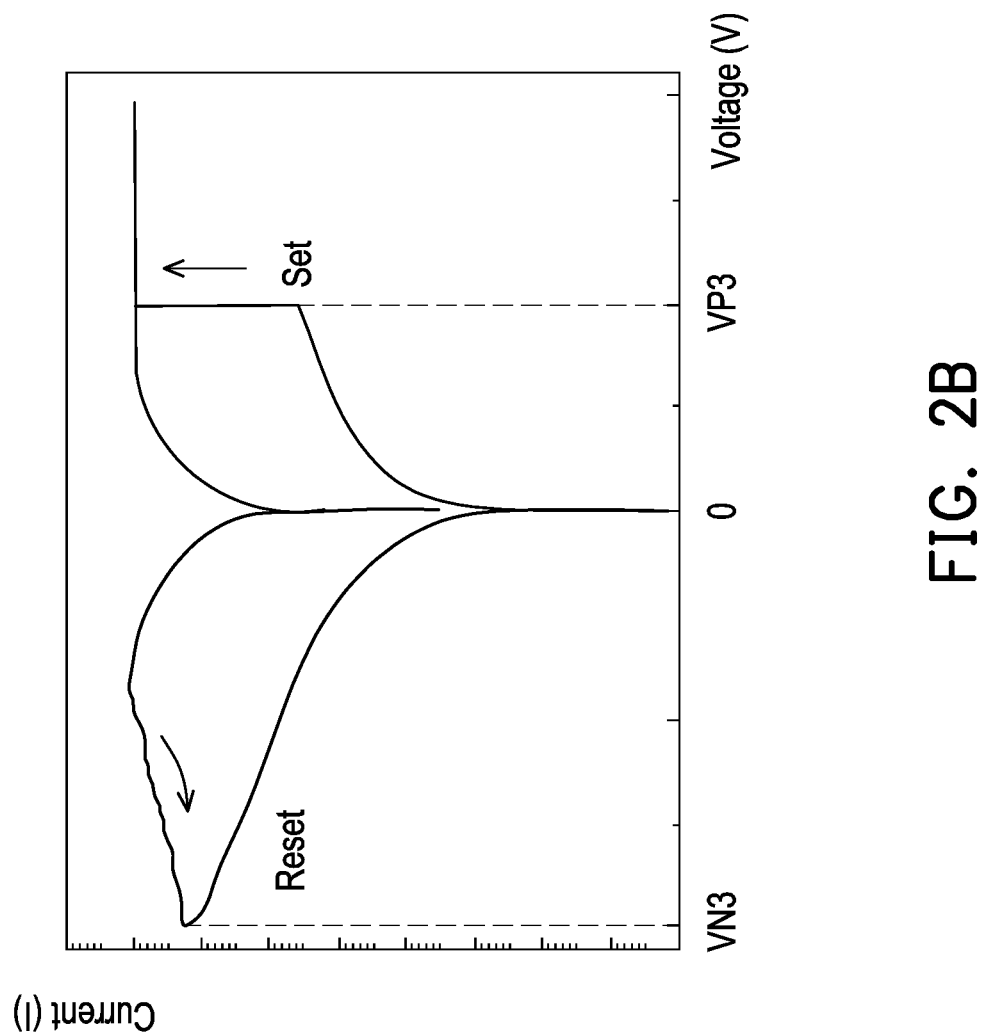
FIG. 2B illustrates a set operation and a reset operation performed on a memory element according to some embodiments.

FIG. 2B illustrates a set operation and a reset operation performed on a memory element 12 according to some embodiments. In some embodiments, the memory element 12 is an RRAM, which has a variable or programmable resistance to store data. Specifically, a process of a set operation performed on the memory device 10 is illustrated on right-hand side of FIG. 2B, and a process of a reset operation performed on the memory device 10 is illustrated on left-hand side of FIG. 2B.

In such embodiment, the RRAM is an SLC and is capable of storing one bit of data. The RRAM is configured to be either set at a low resistance state, or reset at a high resistance state. A process of a set operation performed on the RRAM is illustrated on right-hand side of FIG. 2B. Specifically, the RRAM is initially started at a high resistance state which causes to have a lower current flowing through the RRAM. As the positive voltage applied to the RRAM increases and is passed a threshold voltage VP3, the current flowing through the RRAM rises drastically. The rise of the current flowing through the RRAM reveals that the RRAM is changed from the high resistance state to the low resistance state through the set operation. Thus, as the voltage applied to the RRAM returns to zero, the current flowing through the RRAM at the low resistance state is still kept at a level higher than the RRAM at the high resistance state.

On the other hand, a process of a reset operation performed on the RRAM is illustrated on left-hand side of FIG. 2B. Specifically, the reset operation is started with the RRAM at the low resistance state. Initially, the current flowing through the RRAM rises and then gradually decays as the negative voltage applied to the RRAM decreases during the reset operation. As the voltage reaches a threshold voltage VN3, the reset operation performed to the RRAM is completed which causes the RRAM to be reset from the low resistance state to the high resistance state and causing the lower current flowing through the RRAM. Thus, as the voltage applied to the RRAM returns to zero, the current flowing through the RRAM at the high resistance state is still kept at a level lower than the RRAM at the high resistance state.

Figure 2D:
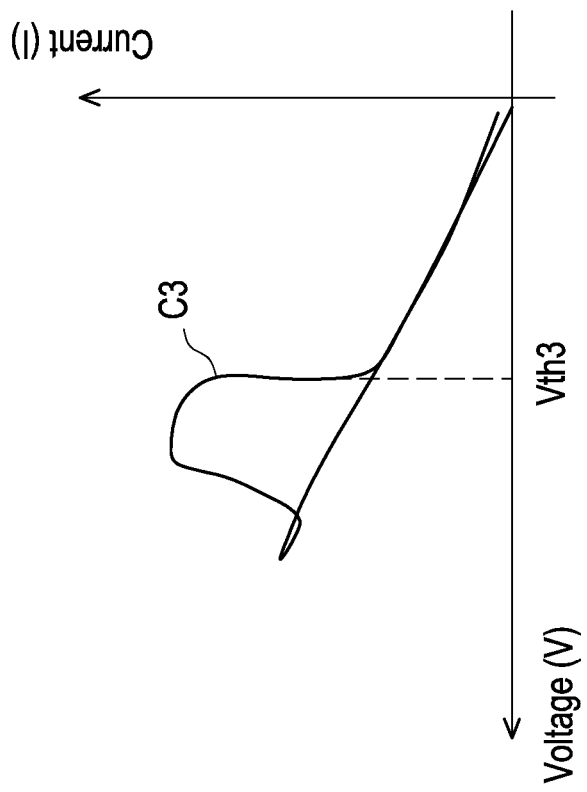
FIG. 2D illustrates a voltage-current relationship curve showing a reset operation performed to the memory device 10 in FIG. 1A according to some embodiments.
Figure 2C:
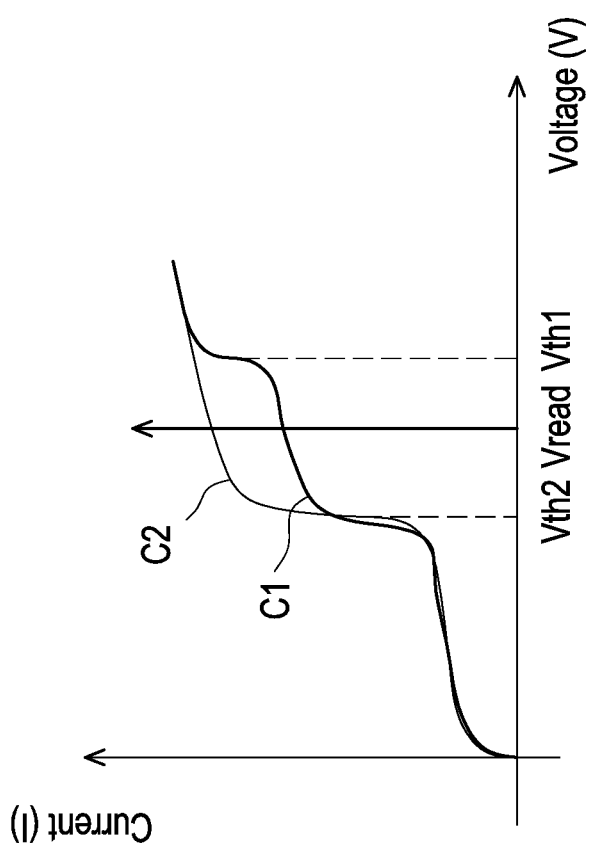
FIG. 2C illustrates relationship curves of the memory device in FIG. 1A having the memory element at different states according to some embodiments.

FIG. 2C illustrates relationship curves C1, C2 of the memory device 10 in FIG. 1A having the memory element 11 at different states according to some embodiments. The curve C1 corresponds to a voltage-current relationship curve of the memory device 10 having the memory element 12 at the high resistance state, and the curve C2 corresponds to a voltage-current relationship curve of the memory device 10 having the memory element 12 at the low resistance state. Specifically, the relationship curves C1, C2 are results accumulated by operations of the selector 11 and the memory element 12 illustrated on right-hand side of FIGS. 2A, 2B.

As can be seen in FIG. 2C, the memory device 10 corresponding to the relationship curve C1 has the memory element 12 at the high resistance state and the memory device 10 corresponding to the relationship curve C2 has the memory element 12 at the low resistance state, since the relationship curve C1 has a lower current level than the relationship curve C2 between threshold voltages Vth1, Vth2. The curve C1 with a lower current level has the higher threshold voltage Vth1. The curve C2 with a higher current level has the lower threshold voltage Vth2. A read operation may be performed to the memory device 10 by applying a read voltage Vread between the threshold voltages Vth1, Vth2 and evaluating the current flowing through the memory device 10 to tell at which state the memory element 12 of the memory device 10 is. Specifically, the lower threshold voltage Vth2 corresponds to the threshold voltage of the selector 11, and the higher threshold voltage Vth1 corresponds to the threshold voltage of the RRAM.

FIG. 2D illustrates a voltage-current relationship curve C3 showing a reset operation performed to the memory device 10 in FIG. 1A according to some embodiments. Specifically, the relationship curve C3 is a result accumulated by operations of the selector 11 and the memory element 12 illustrated on left-hand side of FIGS. 2A, 2B.

Specifically, the reset operation is performed to the memory device 10 having the memory element 12 at the low resistance state. As the negative voltage applied to the memory device 10 decreases, the relationship curve C3 rises at a slope according to a cutoff resistance of the selector 11 and the resistance of the memory element 12. When the voltage applied to the memory device 10 passes a threshold voltage Vth3, the selector 11 is turned on and the current flowing through the memory device 10 rises drastically. Further, due to conduction of the selector 11, the applied voltage to the memory device 10 is mostly received by the memory element 12. When the applied voltage is less than the threshold voltage VN2 in FIG. 2A, the memory element 12 is reset to the high resistance state as described in relation to FIG. 2B. Therefore, the relationship curve C3 rises drastically after the applied voltage reaches the threshold voltage Vth3, and shortly drops after the selector 11 is conducted. Consequently, the memory element 12 of the memory device 10 may be reset to the high resistance state through the reset operation.

FIG. 3A illustrates a relationship curve Cdrift of how a threshold voltage of the selector 11 in FIG. 1A is drifted over time in accordance with some embodiments. Specifically, although the OTS selector 11 in FIG. 1A is advantageous due to simpler structure and ease of integration in 3-D IC, the OTS selector 11 also suffers from issues such as drifted threshold voltage over time. More particularly, a vertical axis in FIG. 2A illustrates a threshold voltage of the selector 11 in FIG. 1A and a horizontal axis in FIG. 2A illustrates an idle time of the selector 11. The idle time in FIG. 2A corresponds to a continuous time length of how long the selector 11 is kept cutoff (i.e., nonconductive). As the idle time of the selector 11 increases, the relationship curve Cdrift accordingly rises, representing that the threshold voltage of the selector 11 is increased during the selector 11 is cutoff (i.e., nonconductive) without turning on. The drifted threshold voltage of the selector 11 may cause the relationship curves in FIGS. 2C, 2D to be varied as well.

FIG. 3B illustrates relationship curves C1', C2' which are transformed from the relationship curves C1, C2 in FIG. 2C after affected by the drifted threshold voltage of the selector 11 in accordance with some embodiments. The relationship curves C1', C2' are represented by sold lines, and the relationship curves C1, C2 are represented by dotted lines. As described in relation to FIG. 2A, the threshold voltages of the selector 11 is increased while the idled time of the selector 11. The increased threshold voltage of the selector 11 will affect the threshold voltage Vth2 in both of the relationship curves C1, C2. Specifically, both of the relationship curves C1', C2' respectively corresponding to the high and low resistance states enter into steady state currents after the risen threshold voltage Vth2' is passed, while another threshold voltage Vth1' stays approximately the same. In some aspects, the right-shifted threshold voltage Vth2', which corresponds to drifted the threshold voltage of the selector 11, affected both of the relationship curves causes a narrower voltage range for applying the read voltage, and a confined current margin to read data from the memory device 10.

FIG. 3C illustrates a relationship curve C3' which is transformed from the relationship curve C3 in FIG. 2D after affected by the drifted threshold voltage of the selector 11, in accordance with some embodiments. The relationship curve C3' is represented by sold lines, and the relationship curve C3 is represented by dotted lines. Specifically, the relationship curve C3 shows the reset operation performed to the memory device 10 in FIG. 1A, which is changed from the high resistance state to the low resistance state during the reset operation. As described in relation to FIG. 2D, the selector 11 is turned on (conductive) when the voltage applied to the memory device 10 passes the threshold voltage Vth3. However, the reset operation also suffers from the drift of the threshold voltage of the selector caused by idle time. The increased threshold voltage of the selector 11 affects the selector 11 to be turned on at a smaller threshold voltage Vth3', causing the threshold voltage Vth3 shifted as the threshold Vth3', and the relationship curve C3 transformed as the relationship curve C3'. However, it is hard to see, based on the relationship curve C3', that whether the reset operation is successfully completed since there is no significant steady state currents (especially the steady state current at the low resistance state), and the voltage rise of the relationship curve C3' after the threshold voltage Vth3' is passed also shrinks. Therefore, drift occurred to the threshold voltage of the selector 11 deteriorates the read operation and the reset operation performed to the memory device 10.

Figure 4:
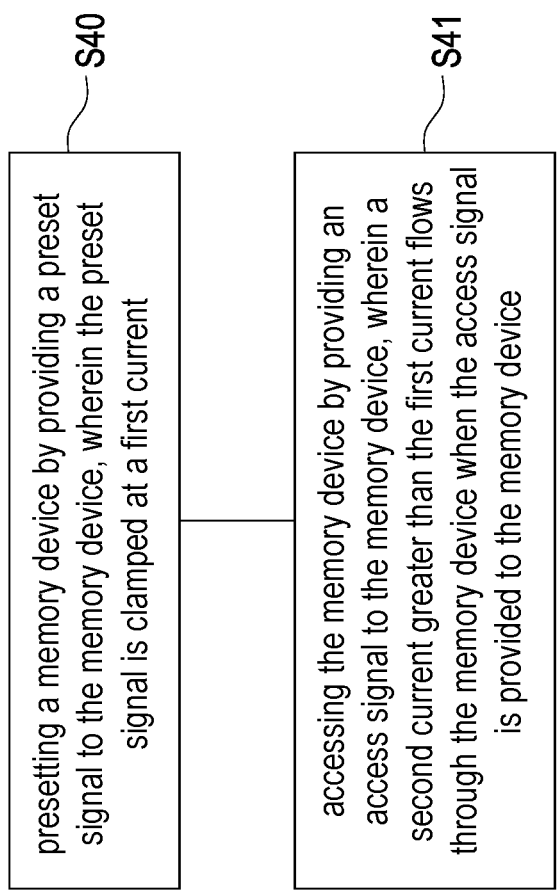
FIG. 4 illustrates an operating method of a memory device in accordance with some embodiments.

FIG. 4 illustrates an operating method of a memory device 10 in accordance with some embodiments. The operating method in FIG. 4 may be utilized to operate the memory device 10 in FIG. 1. Generally speaking, the operating method may help to cancel drift occurred on the threshold voltage of the selector 11, such that the memory device 10 may be accessed properly. The operating method includes steps S40, S41. In step S40, a memory device is preset by providing a preset signal to the memory device. The preset signal is clamped at a first current. In step S41, the memory device is accessed by providing an access signal to the memory device. A second current greater than the first current flows through the memory device when the access signal is provided to the memory device.

Figure 5B:
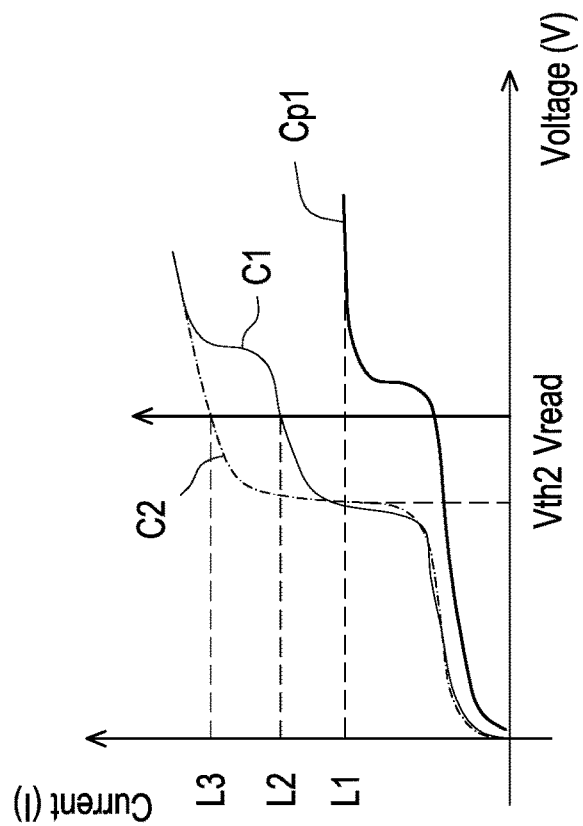
FIG. 5B illustrates a comparison between the relationship curves of the memory device 10 storing different data values and the preset signal in accordance with some embodiments.
Figure 5A:
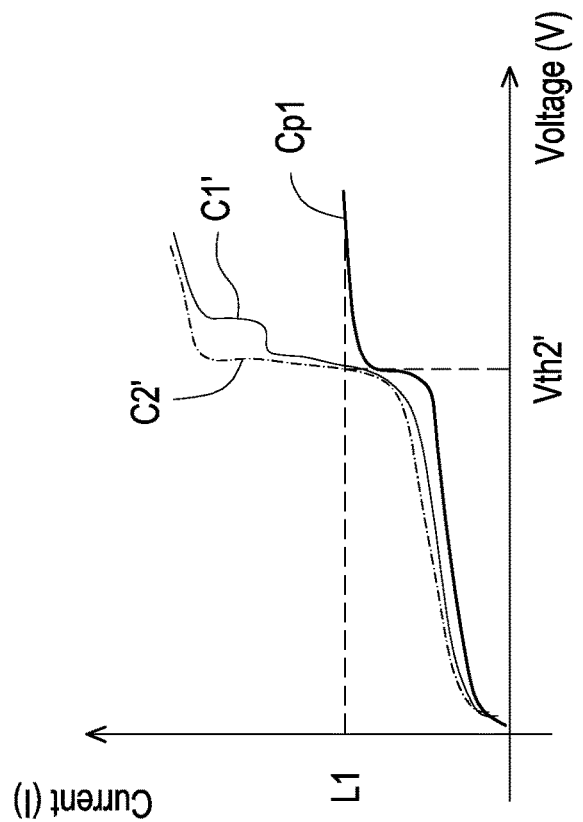
FIG. 5A illustrates a voltage to current relationship curve of a preset signal in accordance with some embodiments.

FIGS. 5A, 5B illustrate a process of performing the operating method in FIG. 4 to readout data from the memory device 10 in accordance with some embodiments. In such embodiment, the operating method is performed to readout data from the memory device 10, and the memory device 10 may be RRAM, PCRAM, mRAM, or the like. As described in relation to FIGS. 3A, 3B, the threshold voltage of the selector 11 is shifted as the memory device 11 is idled. In order to alleviate the drifted threshold voltage of the selector 11, a preset operation is performed to the memory device 10 in step S40.

FIG. 5A illustrates a voltage to current relationship curve Cp1 of a preset signal in accordance with some embodiments. In step S40, the preset signal may be applied to a memory device 10 with drifted threshold voltage to lower the threshold voltage of the selector 11. As described in relation to FIG. 3B, the threshold voltage of the selector 11 is drifted as the selector 11 idles. In order to alleviate drift occurred on the threshold voltage of the selector 11, the preset signal is provided to the memory device 10 aiming to turn on the selector 11 and to restore the threshold voltage of the memory device 10 back to the threshold voltage Vth2. However, to prevent a data stored in the memory element to be modified by the preset operation, only the selector 11 is turned on by the preset signal, rather than both of the selector 11 and the memory element 12. In some embodiments, the preset signal may be a positive voltage signal with its current clamped at a first current L1. A voltage of the preset signal may be greater than the threshold voltage Vth2' of the memory device 10, such that the selector may be turned on by the preset signal. Further, by setting the current of the preset signal at the first current L1, the preset operation may preferably turn on the selector 11 without setting the memory element 11. Specifically, although the preset signal applied to the memory device 10 may be greater than the threshold voltage Vth1 of the memory device 10 in FIG. 2C, the memory element 12 is kept at cutoff since the current of the preset signal is kept at the first current L1. The relatively low first current L1 of the preset signal prevents the memory element 12 from conduction, and thus the data stored in the memory element 12 stays unchanged and data integrity of the memory device 10 may be preserved. In some embodiments, the first current L1 is between 1 pA to 100 mA.

FIG. 5B illustrates a comparison between the relationship curves C1, C2 of the memory device 10 storing different data values and the preset signal Cp1 in accordance with some embodiments. In step S41, after the preset operation, the threshold voltage of the selector 11 may be restored from the threshold voltage Vth2' to the threshold voltage Vth2. The read operation may be performed to the memory device 10 corresponding to the relationship curve C1 or C2 by providing a read voltage Vread (i.e., the access signal). Specifically, the data may be read from the memory device 10 by identifying a level of a second current flowing through the memory device 10 when the read voltage Vread is applied to the memory device 10. When the level of the second current corresponds to the level of a current L3, it may be determined that the memory element 12 is at the low resistance state, and a data stored in the memory device corresponds to a first value. When the level of the second current corresponds to a level of a current L2, it may be determined that the memory element 12 is at the high resistance state, and the data stored in the memory device corresponds to a second value. The current L1 limiting the preset signal is less than both of the currents L2, L3 corresponding to the currents readout from the memory device 10 of different states. As can be observed in FIG. 5B, the memory device 10 has a wider memory window and a larger current margin to readout data from the memory device 10. Thus, the preset operation may effectively prevent drift occurred on the selector 11, thereby improving data integrity of the memory device 10.

Figure 5D:
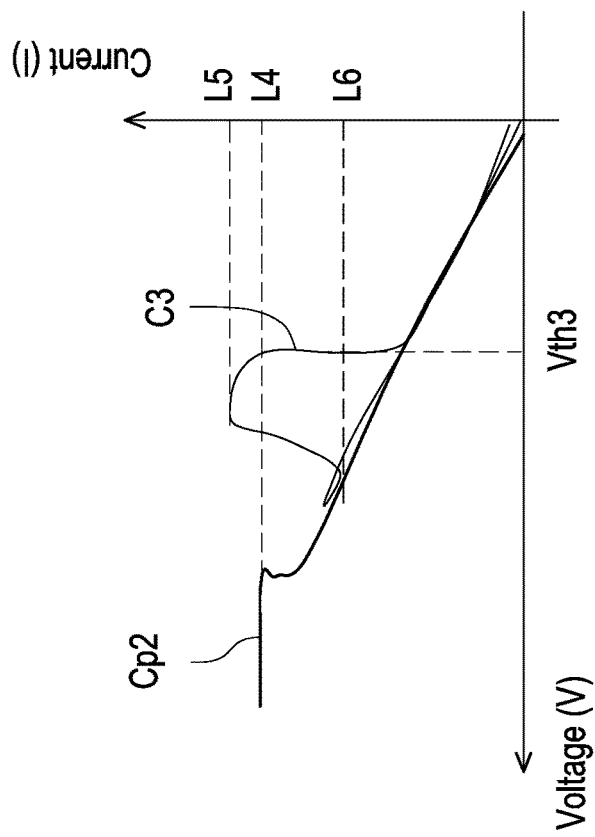
FIG. 5D illustrates a comparison between the relationship curves of performing the reset operation to the memory device 10 and the preset signal in accordance with some embodiments.
Figure 5C:
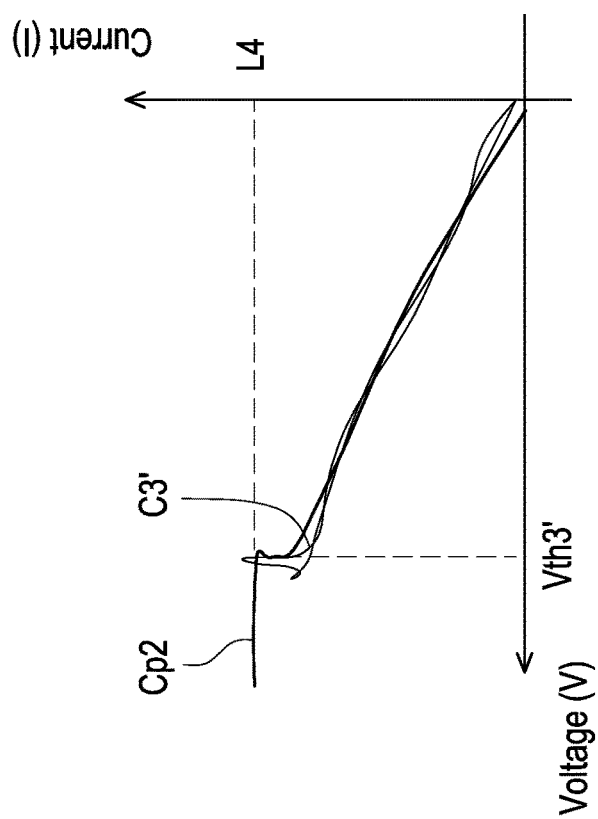
FIG. 5C illustrates a voltage to current relationship curve of a preset signal in accordance with some embodiments.

FIGS. 5C, 5D illustrate a process of performing the operating method in FIG. 4 to program data on the memory device 10 in accordance with some embodiments. In such embodiment, the operating method is performed to program data on the memory device 10, the memory device 10 may be RRAM. As described in relation to FIGS. 3A, 3B, the threshold voltage of the selector 11 is shifted as the memory device 11 is idled. In order to alleviate the drifted threshold voltage of the selector 11, a preset operation is performed to the memory device 10 in step S40.

FIG. 5C illustrates a voltage to current relationship curve Cp1 of a preset signal in accordance with some embodiments. In step S40, the preset signal may be applied to a memory device 10 with drifted threshold voltage to lower the threshold voltage of the selector 11. As described in relation to FIG. 3C, the threshold voltage of the selector 11 is drifted as the selector 11 idles. In order to alleviate drift occurred on the threshold voltage of the selector 11, the preset signal is provided to the memory device 10 aiming to turn on the selector 11 and to restore the threshold voltage of the memory device 10 back to the threshold voltage Vth3. However, to prevent a data stored in the memory element to be modified by the preset operation, only the selector 11 is turned on by the preset signal, rather than both of the selector 11 and the memory element 12. In some embodiments, the preset signal may be a negative voltage signal with its current clamped at a first current L4. A voltage of the preset signal may be less than threshold voltage Vth3' of the memory device 10, such that the selector 11 may be turned on by the preset signal. Further, by setting the current of the preset signal at the first current L4, the preset operation may preferably turn on the selector 11 without resetting the memory element 11. Specifically, although the preset signal applied to the memory device 10 may be less than the threshold voltage Vth3 of the memory device 10 in FIG. 2D, the memory element 12 is kept at cutoff since the current of the preset signal is clamped at the first current L4. The relatively low first current L4 of the preset signal prevents the memory element 12 from conduction, and thus the data stored in the memory element 12 stays unchanged and data integrity of the memory device 10 is preserved.

FIG. 5D illustrates a comparison between the relationship curves C3 of performing the reset operation to the memory device 10 and the preset signal Cp2 in accordance with some embodiments. In step S41, after the preset operation, the threshold voltage of the selector 11 may be restored from the threshold voltage Vth3' to the threshold voltage Vth3. The reset operation may be performed to the memory device 10 to change the memory element 12 into the high resistance state. For example, the reset operation may be performed by providing a reset signal to the memory device 10. The reset signal may be a descending voltage signal. When the reset signal is decreased to be lower than the threshold voltage Vth3 of the selector 11 of the memory device 10, the selector 11 is accordingly turned on, allowing the current flowing through the memory device 10 to be changed to the current L5 since the memory element 12 of the memory device 10 is at the low resistance state. After the reset operation, the current flowing through the memory device 10 is changed from the current L5 corresponding to the low resistance state to a current L6 corresponding to the high resistance state. The current L4 which the preset signal is limited to during the preset operation is located between the currents L5, L6 which are respectively the currents flowing through the memory device 10 during and after the reset operation. As can be observed in FIG. 5D, after the reset operation, changes occurred on the steady state currents of the memory device 10 may be recognized easily compared to that in FIG. 5C. Thus, the preset operation may effectively prevent drift occurred on the selector 11, thereby improving data integrity of the reset operation performed to the memory device 10.

Although it is illustrated in FIGS. 5A-5B that a positive voltage is applied before the readout operation and in FIGS. 5C-5D that a negative voltage is applied before the reset operation, the preset operation is not limited therein. For example, the positive voltage may be applied before the reset operation, and vice versa the negative voltage may also be applied before the readout operation in order to restore the threshold voltage.

Figure 6:
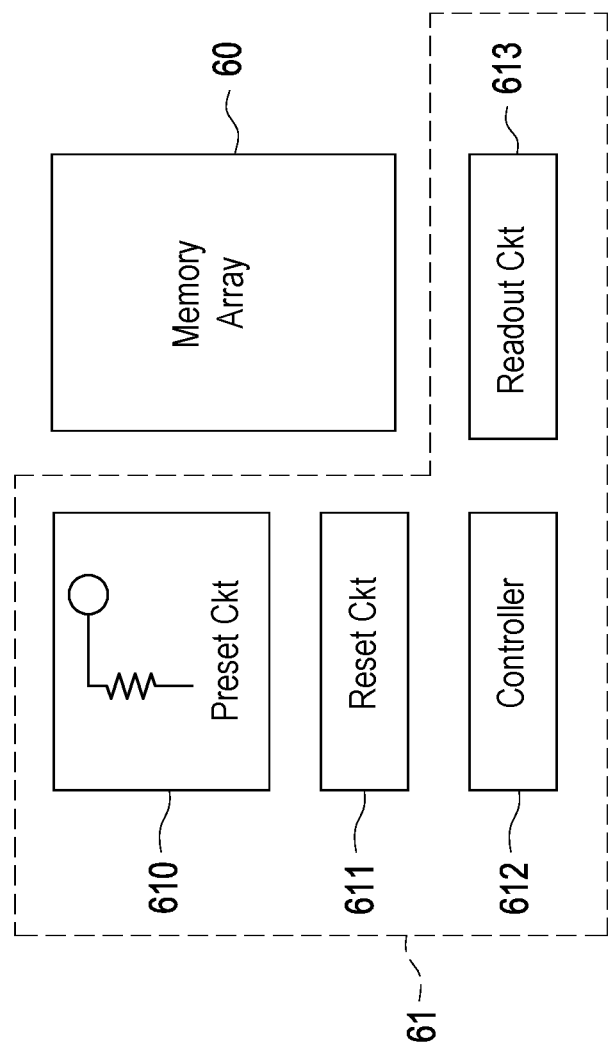
FIG. 6 illustrates schematic block diagram of a memory system according to some embodiments.

FIG. 6 illustrates schematic block diagram of a memory system 6 according to some embodiments. The memory system 6 includes a memory array 60 and a control circuit (also referred as a controller) 61 coupled to the memory array 61. The memory array 60 include a plurality of memory devices 10 in FIG. 1A arranged in rows and columns. The control circuit 61 is configured to control operations of the memory array 60. The control circuit 61 is configured to perform at least one of a read operation, or a write operation (or a program operation), or a set operation, or a reset operation to the memory array 60.

The control circuit 302 includes a preset circuit 610, a reset circuit 611, a controller 611, and a readout circuit 613. In at least one embodiment, the control circuit 61 further includes one or more clock generators for providing clock signals for various components of the memory system 6, one or more input/output (I/O) circuits for data exchange with external devices, and/or one or more controllers for controlling various operations in the memory system 6.

In some embodiments, the driver preset circuit 610, the reset circuit 611, and the readout circuit 613 are coupled to the signal lines of the memory array 60. The controller 612 controls operations of the driver preset circuit 610, the reset circuit 611, and the readout circuit 613, such that proper voltages are provided to the memory array 60 through the signal lines in order to perform at least a read operation, or a write operation (or a program operation), or a set operation, or a reset operation to at least one selected memory device of the memory array 60.

In some embodiments, the controller 612 controls the preset circuit 610 to provide a preset signal to a selected memory device of the memory array 60 through a corresponding signal line. The preset circuit 610 includes a clamp circuit configured to clamp the preset signal at a first current.

In some embodiment, the readout circuit 613 is configured to access the selected memory device of the memory array 60 through a read operation after the reset operation. Particularly, the readout circuit 613 is configured to perform the read operation to the selected memory device through providing a read voltage (i.e., an access signal) to the selected memory device through the corresponding signal. The readout circuit 613 is configured to evaluate a level of a second current flowing through the selected memory device when the read voltage is applied to the selected memory device. When the level of the second current corresponds to a current L3 as illustrate in FIG. 5B, the data stored in the selected memory device corresponds to a first value (e.g., 0). When the level of the second current corresponds to a current L2 as illustrated in in FIG. 5B, the data stored in the selected memory device corresponds to a second value (e.g., 1). Particularly, the second current, either the current L2 or the current L3, readout corresponding to different states from the selected memory device are both greater than the first current applied during the reset operation.

In some embodiment, the reset circuit 611 is configured to access the selected memory device of the memory array 60 through a reset operation. Particularly, the reset circuit 611 is configured to perform the reset operation to the selected memory device through providing a reset signal (i.e., an access signal) to the selected memory device through the corresponding signal. The reset circuit 611 is configured to provide a reset signal with the second current flowing through the selected memory device, to cause the memory element of the selected memory device to be changed from a low resistance state to a high resistance state after the reset operation. Particularly, the current flowing through the selected memory element is changed from the current L5 as illustrated in FIG. 5D to a lower current L6 as illustrated in FIG. 5D after the reset operation. The first current L4 is between the currents L5, L6.

Figure 7A:
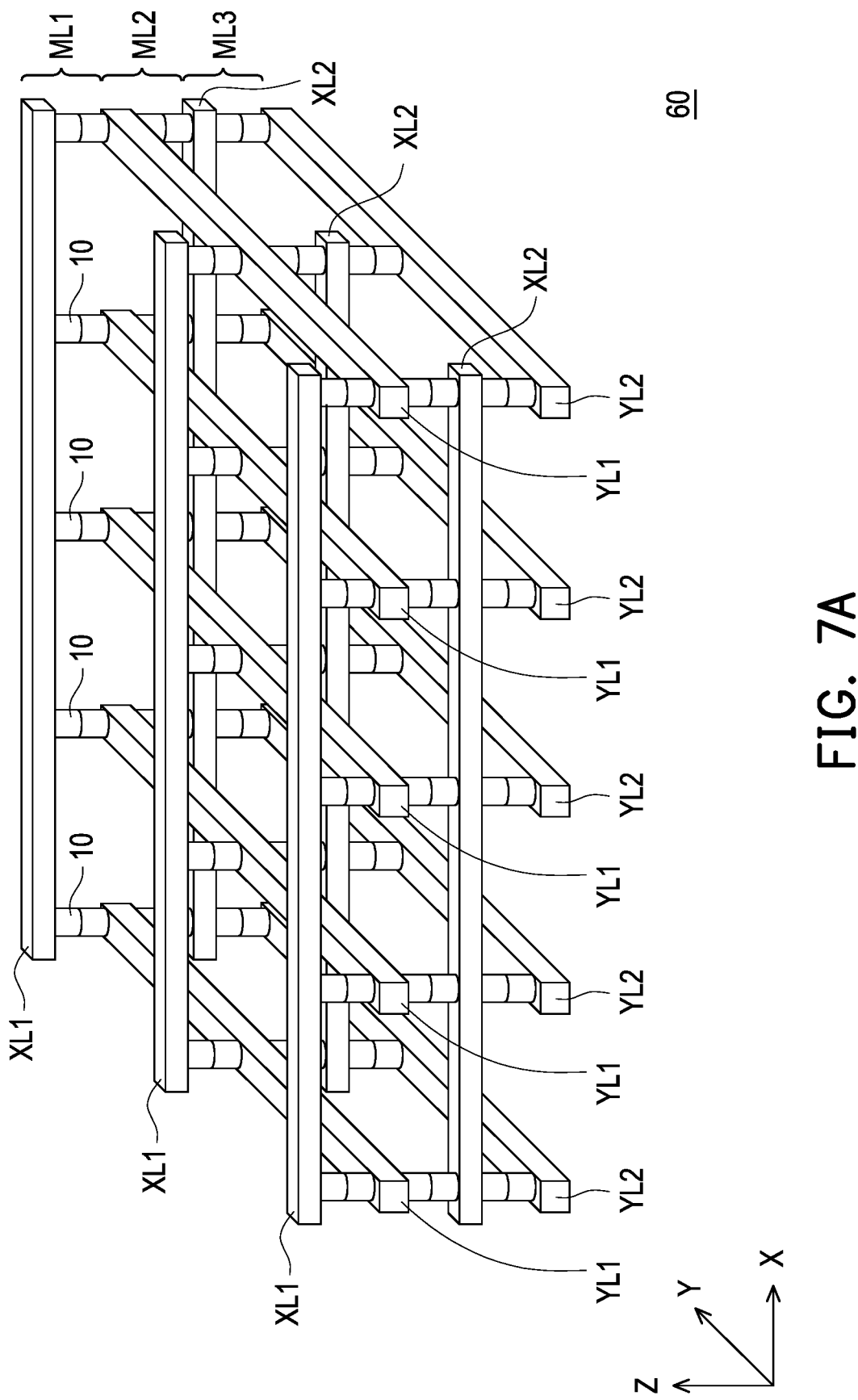
FIG. 7A illustrates a three-dimensional view illustrating a memory array according to some embodiments.

FIG. 7A illustrates a three-dimensional view illustrating a memory array 60 according to some embodiments.

The memory array 300 as illustrated in FIG. 7A includes signal lines XL1, XL2, YL1, YL2 and a plurality of memory devices 10 as illustrated in FIG. 1A. The signal lines XL1, XL2 extends along an x-direction, and the signal lines TL1, YL2 extends along a y-direction. The signal lines XL1 are disposed at a first horizontal level. The signal lines XL2 are disposed at a second horizontal level. The signal lines YL1 are disposed at a third horizontal level. The signal lines YL2 are disposed at a fourth horizontal level. The signal lines XL1, YL1 and the memory devices 10 connected there between form a memory layer ML1. The signal lines YL1, XL2, and the memory devices 10 connected there between form a memory layer ML2. The signal lines XL2, YL2 and the memory devices 10 connected there between form a memory layer ML3. Therefore, adjacent memory layers share the signal lines of a same horizontal level. The memory layers ML1-ML3 are stacked along a z-axis direction. Each memory layers are disposed at different horizontal levels. In some embodiments, operations of a selected memory device 10 in the memory array 300 may be similar to the selection schemes.

As being deployed along the vertical direction, the memory array 60 is no longer limited to two-dimensional design, and storage density can be significantly increased without increasing a footprint area of the memory array 300. Each horizontal level of the memory array 60 may be defined by a layer of the memory devices 10 and the layers of the bit lines and word lines connected thereto. Although the memory array 60 is depicted as having four horizontal levels with three memory layers between the four horizontal levels, those skilled in the art may adjust a number of the horizontal levels of the memory array 60. For instance, the memory cell 60 may have two to ten horizontal levels. However, it should be understood that different numbers of signal lines, memory devices, and memory layers are within the scope of various embodiments.

Figure 7B:
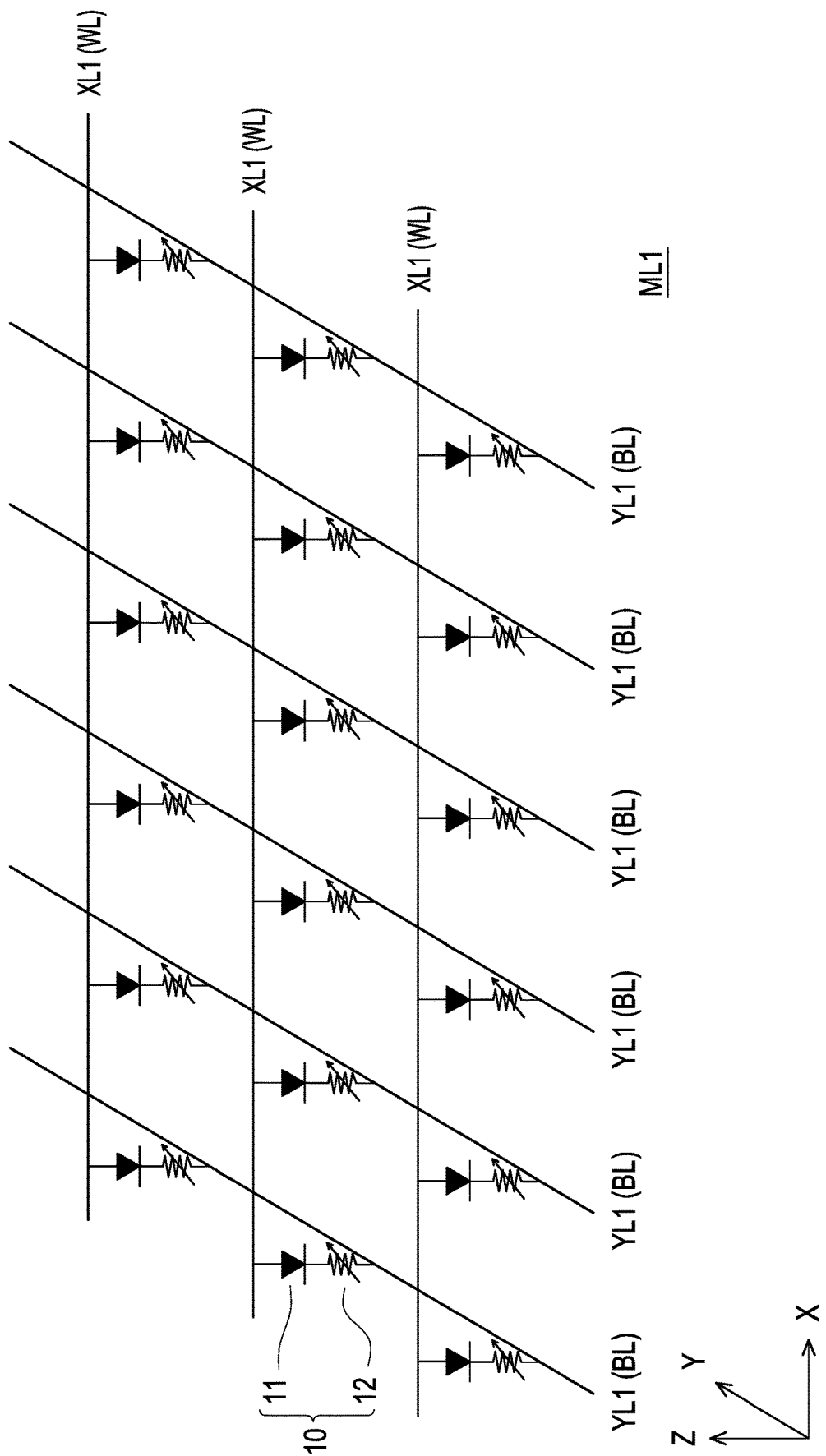
FIG. 7B illustrates a schematic diagram of a memory layer according to some embodiments of the present disclosure. The memory layer includes a plurality of memory devices as illustrated in FIGS. 1A and 1B.

FIG. 7B illustrates a schematic diagram of a memory layer ML1 according to some embodiments of the present disclosure. The memory layer ML1 includes a plurality of memory devices 10 as illustrated in FIGS. 1A and 1B.

In FIG. 7B, a plurality of signal lines XL1 are disposed along an x-direction and may be utilized as word lines WL, and a plurality of signal lines YL1 are disposed along a y-direction and may be utilized as bit lines BL. A memory device 10 is connected between each of the word lines WL and each of the bit lines BL. Each of the memory devices is turned on or cutoff according to the voltages provided to the corresponding word line WL and the corresponding bit line BL. In some embodiments, a selected memory device 10 is accessed according to a voltage difference applied across the selected memory device 10.

In accordance with an embodiment, an operating method of a memory device comprising a selector and a memory element serially coupled to the selector, the operating method comprising: presetting the memory device by providing a preset signal to the memory device, wherein the preset signal is clamped at a first current; and accessing the memory device by providing an access signal to the memory device, wherein a second current greater than the first current flows through the memory device when the access signal is provided to the memory device.

In accordance with an embodiment, a memory system, comprising: a memory array comprising a plurality of memory devices arranged in rows and columns, wherein each of the memory devices comprises a selector and a memory element coupled in series between a word line and a bit line; and a control circuit comprising: a preset circuit coupled to the memory array, and configured to provide a preset signal clamped at a first current to a selected memory device; and a controller coupled to the memory array and the preset circuit, the controller circuit being configured to access the selected memory device by providing an access signal to the selected memory device, wherein a second current greater than the first current flows through the selected memory device when the access signal is provided to the memory device.

In accordance with an embodiment, a control circuit configured to control a memory array, the memory array comprising a plurality of memory devices arranged in rows and columns, wherein each of the memory devices comprises a selector and a memory element coupled in series between a word line and a bit line, the control circuit comprising: a preset circuit coupled to the memory array, and configured to provide a preset signal clamped at a first current to a selected memory device; and a controller coupled to the memory array and the preset circuit, the controller circuit being configured to access the selected memory device by providing an access signal to the selected memory device, wherein a second current greater than the first current flows through the selected memory device when the controller is accessing the selected memory device.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An operating method of a memory device comprising a selector and a memory element serially coupled to the selector, the operating method comprising:
presetting the memory device by providing a preset signal to the memory device to change a threshold voltage of the selector, wherein the preset signal is clamped at a first current; and
accessing the memory device by providing an access signal to the memory device, wherein a second current greater than the first current flows through the memory device when the access signal is provided to the memory device.

2. The operating method of claim 1, wherein the step of presetting the memory device by providing the preset signal to the memory device lowers the threshold voltage of the selector.

3. The operating method of claim 1, wherein the step of accessing the memory device comprises performing a read operation to the memory device, and the memory element is a resistive random-access memory (RRAM), a magnetoresistive random access memory (mRAM), or a phase changing random access memory (PCRAM).

4. The operating method of claim 3, wherein the step of presetting the memory device by providing the preset signal to the memory device comprises providing the preset signal with a positive voltage greater than the threshold voltage of the selector to the memory device, such that the selector of the memory device is turned on by the positive voltage.

5. The operating method of claim 3, wherein the step of accessing the memory device by providing the access signal to the memory device comprises:
evaluating a level of the second current flowing through the memory device when the access signal is provided to the memory device.

6. The operating method of claim 5, wherein when the level of the second current corresponds to a third current, a data stored in the memory device corresponds to a first value; and
when the level of the second current corresponds to a fourth current, the data stored in the memory device corresponds to a second value.

7. The operating method of claim 6, wherein the first current is less than both of the third current and the fourth current.

8. The operating method of claim 1, wherein the step of accessing the memory device comprises performing a reset operation to the memory device, and the memory element is a resistive random-access memory (RRAM).

9. The operating method of claim 8, wherein the step of presetting the memory device by providing the preset signal to the memory device comprises:
providing the preset signal with a negative voltage to the memory device, such that the selector of the memory device is turned on by the negative voltage.

10. The operating method of claim 8, wherein the step of accessing the memory device by providing the access signal to the memory device comprises:
providing a reset signal with the second current flowing through the memory device, to cause the memory element of the memory device to be changed from a first state to a second state after the reset operation.

11. The operating method of claim 10, wherein a current flowing through the memory element is changed from the second current to a fifth current lower than the second current as the memory element is changed from the first state to the second state, and
wherein the first current is between the second current and the fifth current.

12. A memory system, comprising:
a memory array comprising a plurality of memory devices arranged in rows and columns, wherein each of the memory devices comprises a selector and a memory element coupled in series between a word line and a bit line; and a control circuit comprising:
- a preset circuit coupled to the memory array, and configured to provide a preset signal clamped at a first current to a selected memory device; and
- a controller coupled to the memory array and the preset circuit, the controller circuit being configured to access the selected memory device by providing an access signal to the selected memory device, wherein a second current flows through the selected memory device when the access signal is provided to the memory device,
- wherein the second current corresponds to a third current when the memory element is at a first state, and corresponds to a fourth current when the memory element is at a second state, and the first current is less than both of the third and fourth currents.

13. The memory system of claim 12, wherein the preset circuit lowers a threshold voltage of the selected memory device by providing the preset signal to the selected memory device.

14. The memory system of claim 12, wherein the preset circuit is configured to provide the preset signal with a positive voltage to the selected memory device, such that the selector of the selected memory device is turned on by the positive voltage, the memory system comprising:
- a readout circuit coupled to the controller, and configured to perform a read operation to the selected memory device after the selected memory device is preset.

15. The memory system of claim 14, wherein the readout circuit is configured to evaluate a level of the second current flowing through the selected memory device.

16. The memory system of claim 15, wherein when the level of the second current corresponds to the third current, a data stored in the selected memory device corresponds to a first value; and
- when the level of the second current corresponds to the fourth current, the data stored in the selected memory device corresponds to a second value.

17. The memory system of claim 12, wherein the preset circuit is configured to provide the preset signal with a negative voltage to the selected memory device, such that the selector of the selected memory device is turned on by the negative voltage, the memory system comprising:
- a reset circuit coupled to the controller, and configured to perform a reset operation to the selected memory device after the selected memory device is preset.

18. The memory system of claim 17, wherein the reset circuit is configured to provide a reset signal with the second current flowing through the selected memory device, to cause the memory element of the selected memory device to be changed from the first state to the second state after the reset operation.

19. The memory system of claim 18, wherein a current flowing through the memory element is changed from the second current to a fifth current lower than the second current as the memory element is changed from the first state to the second state, and
- wherein the first current is between the second current and the fifth current.

20. A control circuit configured to control a memory array, the memory array comprising a plurality of memory devices arranged in rows and columns, wherein each of the memory devices comprises a selector and a memory element coupled in series between a word line and a bit line, the control circuit comprising:
- a preset circuit coupled to the memory array, and configured to provide a preset signal clamped at a first current to a selected memory device without turning on the memory element in the selected memory device; and
- a controller coupled to the memory array and the preset circuit, the controller circuit being configured to access the selected memory device by providing an access signal to the selected memory device, wherein a second current greater than the first current flows through the selected memory device when the controller is accessing the selected memory device.

* * * * *